Oct. 30, 1956   J. STUART III   2,768,647
PRESSURE RESPONSIVE DEVICE
Original Filed Dec. 3, 1945   2 Sheets-Sheet 2
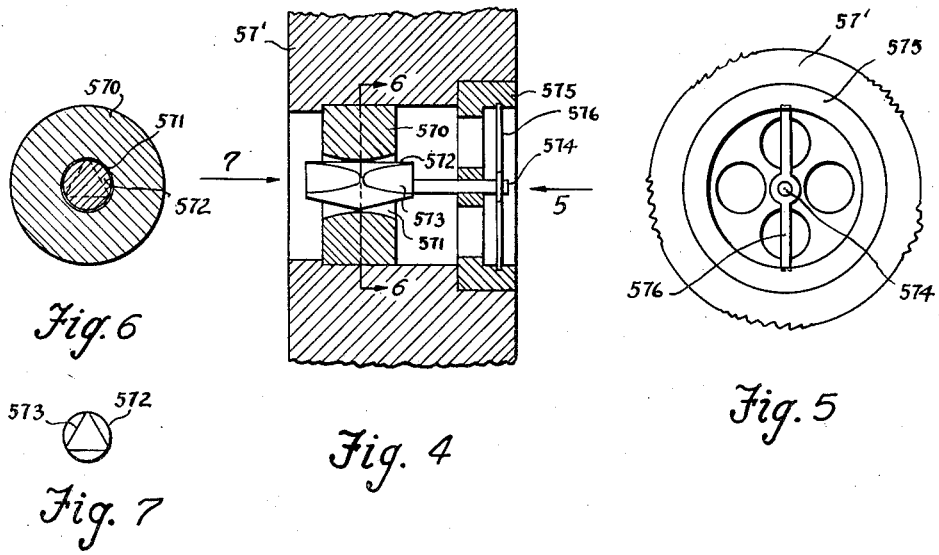

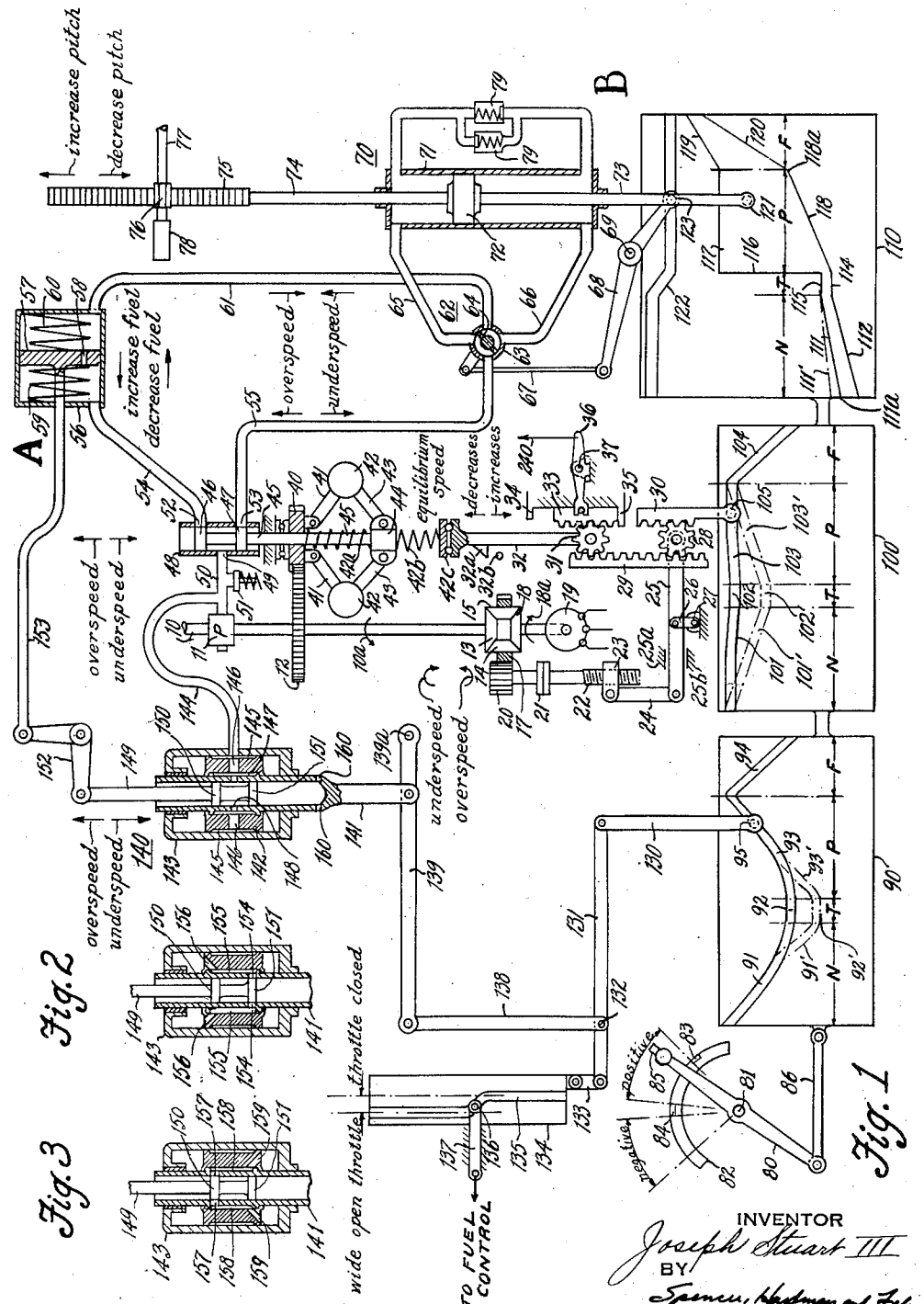

United States Patent Office 2,768,647
Patented Oct. 30, 1956

2,768,647

PRESSURE RESPONSIVE DEVICE

Joseph Stuart III, Dayton, Ohio, assignor to General Motors Corporation, Detroit, Mich., a corporation of Delaware Original application December 3, 1945, Serial No. 632,566, now Patent No. 2,664,959, dated January 5, 1954. Divided and this application October 23, 1953, Serial No. 393,167

2 Claims. (Cl. 138—46)

This invention relates to the control of the speed of a prime-mover propeller power plant particularly for use in airplanes, and is a division of Serial No. 632,566, filed December 3, 1945, now Patent No. 2,664,959.

An object of the present invention is to provide a system of speed control having stability of operation which provides for quick correction of speed error even with internal combustion turbines or other prime-movers having relatively high inertia. This object is accomplished by an hydraulic blade angle controller and by an hydraulic fuel-controller using the same pressure fluid, the flow rate to each controller being under the control of a speed-sensitive valve whereby the rate of change of blade angle and the change of fuel setting (engine torque) is proportional to the amount off-speed. Since the two servos operate on the same pressure fluid whose flow-rate is being controlled by the same speed responsive valve, the control system is free from discrepancies and errors.

Further objects and advantages of the present invention will be apparent from the following description, reference being had to the accompanying drawings, wherein a preferred embodiment of the present invention is clearly shown.

In the drawings:

Fig. 1 is a diagram of the present control system.

Figs. 2 and 3 are longitudinal sectional views in different planes of the servo-motor 140 of Fig. 1.

Fig. 4 is a fragmentary longitudinal sectional view showing a modified form of piston of Fig. 1 equipped with automatic orifice control.

Fig. 5 is a view in the direction of arrow 5 of Fig. 4.

Fig. 6 is a sectional view on line 6—6 of Fig. 4.

Fig. 7 is a view in the direction of arrow 7 of Fig. 4.

Referring to Fig. 1, a shaft 10 driven by the engine shaft drives an oil pump 11, a gear 12 and a bevel gear 13 meshing with bevel gears 14 and 15 supported by a gear 17 and meshing with a gear 18 driven by a three-phase synchronous motor 19 operated by a master generator (to be described) which is driven by an electric motor at a predetermined speed for the purpose of synchronizing or equalizing the governed speeds of the engines of the multi-engine airplanes. So long as the speed of gears 13 and 18 are equal and opposite there will be no rotation of gears 17, but this gear will rotate in one direction or the other, depending on the difference in the speeds of gears 18 and 13. Gear 17 meshes with gear 20 connected by a friction clutch 21 with a screw 22 engaged by a nut 23, connected by a link 24 with a lever 25 movable between limit stops 25a and 25b and pivotally supported by a link 26 pivoted at 27. Lever 25 carries a pinion 28 meshing with racks 29 and 30. Rack 29 is engaged by pinion 31 pivotally supported by rod 32 and meshing with a rack 33 actuated between stops 34 and 35 by a lever 36 pivoted at 37.

The gear 12 meshes with a gear 40 connected by links 41 with fly-weights 42 connected by links 43 with a collar 44 attached to a valve stem 45 providing lands 46 and 47 slidable within a guide 48 having an inlet port 49 connected with the pump outlet 50 having a pressure relief valve 51. Guide 48 has ports 52 and 53 connected respectively with pipes 54 and 55. Pipe 54 is connected with a cylinder 56 receiving a piston 57 having an orifice 58 and balanced between springs 59 and 60. Cylinder 56 is connected with pipe 61. Pipes 55 and 61 are connected with the body 63 of a switch-over valve 62 having a movable valve member 64 for connecting pipes 55 and 61 respectively with pipes 65 and 66, or vice versa. Valve member 64 is actuated by a link 67 connected with a lever 68 pivoted at 69.

Pipes 65 and 66 are connected with cylinder 71 of a servo motor 70 having a piston 72 connected with rods 73 and 74. Rod 74 is connected with a rack 75 meshing with a gear 76 which operates shaft 77 connected with a blade pitch control unit to be described. Shaft 77 operates an instrument 78 known as a "selsyn" for transmitting to the instrument board an indication of blade pitch. Relief valves 79 limit the oil pressures exerted on piston 72. These valves open at such low pressure that flow-rate is not appreciably curtailed although the piston 72 is at the end of its travel. Blade angle may be controlled manually although pressure may be applied to the piston 72. This will be described later.

Centrifugal force acting on weights 42 is opposed by spring 42a and is assisted by spring 42b. The compression of the spring 42b is adjusted by movements of rod 32 transmitted through a thrust bearing 42c to the spring 42b.

A main control lever 80 pivoted at 81 moves along a quadrant sector 82 having a feathering stop 83 and a transition stop 84 engaged by a plunger (not shown) carried by the lever 80. By pressing a button 85, the plunger is retracted so that the lever 80 may move clockwise past the stop 83 into feather controlling position or counterclockwise past the stop 84 into negative thrust controlling position. Stops 83 and 84 normally confine the movement of lever 80 to positive thrust controlling position. Lever 80 is connected by link 86 with three cam plates, namely, throttle setting cam plate 90, speed setting cam plate 100 and a cam plate 110 having means for limiting blade angle and having a cam for controlling a switch-over valve 62.

Plate 90 provides a cam groove having a portion 91 coordinating throttle setting with negative pitch control, a portion 92 for transition between negative pitch control and positive pitch control, a portion 93 for coordinating throttle setting with positive pitch control and a portion 94 for coordinating throttle setting with feathering control. This cam groove receives a roller 95.

Plate 100 provides a cam groove having a portion 101 controlling speed for negative pitch, a transition groove 102, a portion 103 for controlling speed for positive pitch and a portion 104 controlling speed for feathering. Portions 101, 102 and 103 are for turbine control. Portions 101', 102', and 103' are for reciprocating engine control. This cam groove receives a roller 105 carried by the rack 30.

The cam plate 110 provides a cam groove of varying width bounded on the upper side by the walls 111, 115, 116, 117 and 119, and on the lower side by walls 112, 114, 118 and 120. This irregular cam groove receives a roller 121 supported by rod 73. The portion bounded by walls 111, and 112 provides the blade angle limiting portion for negative pitch control. The portion bounded by walls 114 and 115 is a transition gate for receiving roller 121 when conditions are proper for change between positive and negative pitch control or vice versa. The portion bounded by walls 116, 117 and 118 provides the portion for limiting the blade angle for positive pitch control.

The portion bounded by walls 119 and 120 limits the blade angle for feathering.

The plate 110 provides a cam groove 122 receiving a roller 123 on lever 68. When shifting into negative pitch control, cam 122 raises roller 123 and causes valve 62 to reverse the connections with cylinder 71.

The roller 95 which is received in the cam groove of plate 90 is carried by a rod 130 attached to a lever 131 having a floating fulcrum 132 and connected by a link 133 with a plate 134 having a throttle actuating cam groove 135 for receiving a roller 136 mounted on a rod 137 connected in any suitable manner with the throttle mechanism of the prime-mover, either the throttle valve of a carburetor reciprocating engine or the fuel flow control valve of a fuel injection reciprocating engine or a gas turbine.

The floating fulcrum 132 of lever 131 is supported by a link 138 connected with a lever 139 pivoted at 139a. Lever 139 is connected with the piston rod 141 of a servo-motor 140. Rod 141 is attached to a piston 142 movable in the axially fixed cylinder 143. The pressure fluid for moving the piston in either direction enters the side of cylinder 143 through a pipe 144 connected with pump outlet 50. Pipe 144 communicates with an annular groove 145 provided by the piston 142. Groove 145 is connected by passages 146 with diametrically opposite grooves 147 provided by the piston rod 141. Grooves 147 are connected by diametrically opposite holes 148 with the interior of the rod 141. Rod 141 receives a valve 149 having lands 150 and 151 and connected by bell-crank 152 and link 153 with the piston 57 within the cylinder 56. Referring to Fig. 2 which is a longitudinal sectional view of the servo-motor 140 in a plane 120° from the plane of the sectional view shown in Fig. 1, the land 151 controls diametrically opposite ports 154 connected with diametrically opposite grooves 155 of the rod 141; and grooves 155 are connected by holes 156 with the upper end of the cylinder 143 as viewed in Fig. 2. Referring to Fig. 3, which shows a longitudinal sectional view taken in a plane 120° with respect to the planes of the longitudinal sectional views of Figs. 1 and 2, the land 150 controls ports 157 connected with diametrically opposite grooves 158 of the rod 141 and grooves 158 are connected by holes 159 with the lower end of the cylinder 143.

As the valve 149 moves, the piston 142 follows the valve. For example, if valve 149 moves down the ports 154 are uncovered, and pressure fluid is admitted to the upper end of cylinder 143 to cause piston 142 to move down the distance that valve 149 had moved down. Fluid in the lower end of the cylinder escapes through holes 159, grooves 158, ports 157 and the upper end of rod 141. If valve 149 moves up, ports 157 are uncovered, and pressure fluid is admitted to the lower end of cylinder 143 to cause piston 142 to move up the distance that valve 149 had moved up. Fluid in the upper end of cylinder 143 escapes through holes 156, grooves 155, ports 154 and holes 160 in the rod 141.

The pressure fluid which is discharged from the rod 141 is received by suitable chambers, not shown, which enclose the servo-motor 140, the pressure fluid being returned to the intake of the pressure pump 11. The discharge from the valve sleeve 48 is likewise received by a reservoir enclosing the pump 11.

The valve 149 is actuated by the piston 57 in the cylinder 56. The piston 57 moves right when oil flows from the pipe 54 through the cylinder 56 and into the pipe 61; and piston rod 141 and cam 134 move up and rod 137 moves right to close the fuel valve or throttle. Piston 57 moves left when this flow is reversed; and the cam 134 moves down to open the fuel throttle. If the total oil pressure acting upon the piston 57 were sufficient to operate the engine throttle through the cam plate 134, the servo-motor unit 140 could be omitted and the piston 57 would be directly connected with the lever arm 139.

An explanation of the various legends appearing on Fig. 1 will now be made. The negative, transition, positive and feathering portions of the cam grooves of plates 90, 100 and 110 are respectively indicated by the double arrow lines marked respectively N, T, P and F. The positive range of the main control lever 80 is indicated by the double arrow arc marked "Positive." The negative range of the main control lever 80 is indicated by the double arrow arc marked "Negative." The extreme positions of the roller 136 within the throttle actuating cam groove 135 are indicated respectively by vertical dot-dash lines marked "Throttle Closed" and "Wide Open Throttle." The movement of the piston rod 141 of the servo-motor 140 to correct an over-speed is indicated by the arrow marked "Over-Speed." The movement of rod 141 to correct for under-speed is indicated by the arrow marked "Under-Speed." The movement of valve rod 45 to correct over-speed is up, as indicated by the arrow marked "Over-Speed." The movement of valve rod 45 to correct under-speed is down, as indicated by the arrow marked "Under-Speed." Adjacent the rod 32 are two arrows marked respectively "decreases" and "increases" indicating, respectively, the movement for equilibrium speed decrease or increase. The direction of rotation of the shaft 10 is indicated by arrows 10a. The direction of rotation of gear 18 is indicated by arrow 18a. Looking down upon the gear 20 the direction of rotation to correct over-speed relative to the master is counterclockwise, as indicated by the arrow marked "overspeed;" and, to correct for under-speed, the direction of rotation of gear 20 is clockwise, as indicated by the arrow marked "under-speed." The flow of pressure oil through the pipes 55 and 61 to correct over-speed is indicated by the adjacent arrows marked "overspeed"; and the direction of flow to correct under-speed is indicated by the adjacent arrows marked "under-speed." The direction of movement of rack 75 to obtain increased pitch or decreased pitch are indicated by arrows respectively marked by appropriate legends.

The downward movement of rod 32 for the purpose of increasing equilibrium speed is limited by lug 32a which engages a stop 32b, to prevent any unsafe maximum speed being called for.

In order to understand the function of the control apparatus with respect to stability of governing action, reference is made to the fundamental equation of the power plant and controller combination which is:

$$J\ddot{\phi} + \frac{\partial Q_1}{\partial \phi} \cdot \dot{\phi} + \frac{\partial Q_2}{\partial \beta} \cdot \beta = 0$$

$J =$ polar moment of inertia of all rotating parts referred to the propeller shaft axis.

$\phi =$ angular displacement (radians) of the rotating mass relative to a reference rotating at constant speed.

$\dot{\phi}$ or $\frac{\partial \theta}{\partial t} =$ velocity of displacement (radians/sec.).

$\ddot{\phi}$ or $\frac{\partial_2 \phi}{\partial t_2} =$ acceleration of displacement (radians/sec.$^2$).

$Q_1 =$ torque due to off-speed.

$\frac{\partial Q_1}{\partial \phi} = \frac{\text{increment of torque due to off-speed}}{\text{increment of velocity of displacement}}$ $\beta =$ blade angle change.

$Q_2 =$ torque due to blade angle change.

$\frac{\partial Q_2}{\partial \beta} = \frac{\text{increment of torque due to blade angle change}}{\text{increment of blade angle change}}$ Torque I due to acceleration $= J\ddot{\phi}$ Torque II due to speed error $= \frac{\partial Q_1}{\partial \phi_2} \times \dot{\phi}$ Torque III due to blade angle change $= \frac{\partial Q_2}{\partial \beta} \times \beta$ Displacement of stem 45 is proportional to the speed error or $\dot{\phi}$. Rate of oil flow to servo-motor 70 is proportional to $\dot{\phi}$. As rate of pitch change is directly determined by the oil flow rate, it follows that $\dot{\beta}$ is proportional to $\dot{\phi}$. $\dot{\beta}=K\dot{\phi}$ or, integrating, $\beta=K\phi$, $K$ being the proportionalizing rate of the governor. Therefore $$\text{Torque III}=\frac{\partial Q_2}{\partial \beta}\cdot K\phi$$

The algebraic sum of Torques I, II and III is zero in free motion of the system.

$$J\ddot{\phi}+\frac{\partial Q_1}{\partial \dot{\phi}}\dot{\phi}+\frac{\partial Q_2}{\partial \beta}\cdot K\phi=0$$

The only variable is $\phi$
Torque I varies with acceleration of $\phi$, $(\ddot{\phi})$
Torque II varies with velocity of $\phi$, $(\dot{\phi})$
Torque III varies with amount of $\phi$, $(\phi)$ Torque II represents the sum of the effect of aerodynamic damping and of throttle control by piston 57 (Fig. 1). Piston 57 effects a throttle control in response to velocity of flow of pressure oil entering or leaving cylinder 71. It is responsive to $\dot{\phi}$, velocity of displacement; and as engine torque is a function of throttle setting, a correcting torque proportional to off-speed, $\dot{\phi}$, results.

Torque III represents the function of piston 72 (Fig. 1) which changes blade angle in proportion to $\phi$, the amount of displacement.

This means that the fly-weights 42 in responding to an increase or decrease in speed, actuates the valve member 45 in proportion to off-speed. In so moving the valve directs flow of fluid from the source 11 in proportion to off-speed, or in proportion to speed error. The flow from valve 45 is directed either by 54 to cylinder 56 and then by 61 to cylinder 71 where it displaces piston 72 in proportion to speed error, or it is directed by 55 to cylinder 71 where it also displaces piston 72 in proportion to speed error. Thus the rate of fluid flow to the cylinder 71 is proportional to speed error, and the total flow of fluid to the cylinder 71 during off speed will be the summation of all flow due to speed error, were it not for the relief valves 79 capable of passing fluid around the cylinder 71 when manual control of the blade angle overrides the governor control. The complete circuit of fluid flow to and from the cylinder 71 passes through the cylinder 56 by means of the orifice 58, but the orifice 58 does not alter the amount of flow to the cylinder 71. However the rate of flow of fluid through the piston 57 by way of the orifice 58 modifies the rate of movement of the piston 57. Discharge through the orifice is somewhat limited, being less than that capable through either passage 54 or 61, any movement of the piston 57 is resisted by one or the other of the springs 59 or 60, and flow into either end of the cylinder 56, builds up pressure, first resisted only by the restricted orifice 58 and then the opposing one of the springs. High rates of flow to the cylinder 56 build up greater pressures than do low rates of flow, wherefore movement of the piston 57 will vary with the rate of fluid flow and the speed error. While equal unit volumes of fluid may pass through the distributing port of the valve 45 will in general effect equal movements of the piston 72, the displacement of the piston 57 may be otherwise, due to the rate of flow of those unit volumes, hence there is response to integrated speed error.

Stability of governing action is effected because, while piston 72 is operating to govern the engine by changing blade angle in proportion to $\phi$ to give a "spring" action, piston 57 is operating to give adequate damping of the system by changing the fuel rate (torque) in response to $\dot{\phi}$. While refinements of this nature have not been necessary with the conventional reciprocating engine propeller combination, equally adequate system response in the case of systems using internal combustion turbines having greatly increased effective inertia referred to the propeller shaft axis requires increased rate of pitch change and vastly increased damping which can most readily be effected through the fuel control of the turbine as indicated in the foregoing. These refinements are particularly necessary in the case of the turbine because of much greater susceptibility to damage by overspeeding. The damping by means of the fuel rate control positively and immediately prevents any serious overspeeding. The equivalent of this action cannot be obtained by devices acting upon propeller pitch unless impractically high rates of pitch changes are available to counteract sudden changes in fuel control settings by the pilot. To keep the maximum overspeed down to an acceptable value, controller A and its linkages to cam 134 and the cam rise of 134 will preferably be so proportioned that an overspeed as little as 1% will cause controller A to fully close a fully open throttle.

The orifice 58 in the piston 57 represented diagrammatically in Fig. 1 is a type of orifice which gives a pressure differential substantially in proportion to the first power of the rate of flow. The simple orifice which is shown diagrammatically will give substantially the required effect when the displacement of piston 57 is relatively great. In order to obtain the desired effect for small piston displacement, the construction shown in Figs. 4 through 7 may be used. Piston 57' (Fig. 4) carries a bushing 570 having hole 571 having the least diameter at mid-section line 20—20 increasing to the greatest diameters at the sides of the bushing 570. Hole 571 receives a plug 572 which is circular in cross section at its middle portion and which is provided with "flats" 573 so that the end views of the plug are that shown in Fig. 7. The middle portion of the plugs 572 is normally located at the section line 20—20 at which the hole 571 has the smallest diameter, said diameter being slightly greater than the diameter of the middle portion of the plug as shown in Fig. 4. Plug 572 is attached to a rod 574 loosely slidable through an apertured plate 575 supporting the ends of a leaf spring 576 connected at its middle portion with the rod 574. The spring 576 resists displacement of the plug 572 in either direction from the normal position shown in Fig. 4. When the conditions causing displacement of the plug 572 from normal position cease, the spring 576 returns the plug to normal position. As the rate of flow of hydraulic fluid through the hole 571 increases, the area of the orifice at section line 20—20 between the plug 572 and the bushing 570 increases. The shape of the plug 572 is such that the difference between the pressures on opposite sides of the piston 57' will be substantially in proportion to the first power of the rate of flow through said orifice.

The simple orifice 58 of Fig. 1 or the variable orifice of Fig. 4 can be located in parallel with the piston of cylinder 56 in any manner. For example, either of these orifices may be located in a by-pass connecting the ends of cylinder 56.

*Summary*

The apparatus for governing the speed of the prime-mover has inherent stability because it includes instruments which are respectively sensitive to $\phi$ (displacement or integrated speed error) and to $\dot{\phi}$ (rate of displacement or speed error). The instrument sensitive to $\phi$ adjusts the torque absorbing ability of the work-device (propeller) operated by the prime-mover. The instrument sensitive to $\dot{\phi}$ adjusts the medium (fuel) which causes operation of the prime-mover. Both instruments operate jointly during the normal operating range of the prime-mover to effect a stable governing action.

In the application of the governing apparatus to a prime-mover-propeller power-plant, the instrument sensitive to $\phi$ operates to change blade-pitch in proportion to $\phi$ and at a rate proportional to $\dot{\phi}$, amount of speed error. The instrument sensitive to $\dot{\phi}$ operates to effect a deviation of fuel rate from normal (as set by cam 90). Hence the rate of deviation of fuel rate from normal is proportional to $\dot{\phi}$ or rate of change of speed error. For example, if the prime-mover starts to overspeed, blade angle starts to increase at a rate proportional to the amount of speed error. This increase is accompanied by a decrease of fuel rate, from the rate set by cam 90, at a rate which is proportional to the rate of change of speed. The decrease in fuel rate has the effect of lowering the maximum of the speed error at which instant the blade-angle is being increased at the maximum rate. As speed error falls, the rate of blade-angle increase diminishes and the fuel rate is caused to increase to the normal rate set by cam 90. The rate of fuel-rate increase toward normal is proportional to the rate of decrease of speed error toward the governed speed set by cam 100. By the time blade-angle has been increased to give zero speed error, the deviation of fuel-rate from normal will be zero in the case of the use of a degree of stabilization equal to or greater than the critical amount. There is a temporary modification of fuel-rate for the purpose of securing stability; but the fuel-rate returns to normal when that purpose has been accomplished.

Errors have been substantially eliminated because there is a common zero for the $\phi$-sensitive instrument B and the $\dot{\phi}$-sensitive instrument A; and there is a common operating medium for these instruments. The common zero is established by the speed controlled valve (parts 45, 46 and 47); and the common operating medium is the pressure fluid which actuates instruments A and B when this valve responds to speed error.

The speed responsive governor valve controls rate of fluid flow in proportion to the amount of off-speed. Hence the apparatus provides an hydraulic flow proportionalizing governor. It feeds pressure fluid to the servo-motor, instrument B, the displacement of whose piston is a measure of $\phi$. It feeds pressure fluid to the orifice 58 of the piston of instrument B. The pressure differential across the orifice 58 furnishes a measure of $\dot{\phi}$. This orifice 58 and the linkage system to cam 134 is so proportioned as to give the desired degree of stabilizing action to the complete system. The degree of stabilization may be the critical amount in which case there would be only one oscillation of speed error from zero to maximum and return to zero. Usually the practice is to use a degree of stabilization less than critical since equilibrium is substantially established in less time than with the critical amount altho there would be a few additional slight oscillations of speed error before return to zero.

The governing system is well-adapted for use with a prime-mover having relatively high effective inertia such as the internal-combustion turbine which is desirably operated at high R. P. M. throughout the full operating range. The necessary governing action is effected without requiring blade angle change to be made at impractically high rates because the temporary fuel-rate modification helps to maintain the maximum speed error within safe limits while blade angle is being changed at a practical rate.

The apparatus provides means for controlling the engine-propeller power plant to effect the desired engine speed and power during all positive and negative thrust operating conditions. This means is under control by a single main control lever which operates in a desired range of negative thrust and in a desired range of positive thrust including feathering. The control means provides for direct manual control of blade angle during relatively low blade angle conditions when $$\frac{\partial Q}{\partial \beta}$$

is practically zero. Blade angle can be set manually by the main control lever to the proper value for starting the prime mover.

While the embodiments of the present invention as herein disclosed, constitutes a preferred form, it is to be understood that other forms might be adopted, all coming within the scope of the claims which follow.

What is claimed is as follows:

1. A flow sensitive device for use in a fluid pressure system including a source of fluid pressure, a valve having a supply port connected with said source and a pair of control ports, and a pair of conduits connected to said control ports whereby said valve may be actuated to effect flow from said source through either of said conduits while the other conduit is connected to drain, comprising, a cylinder connected between said conduits, a reciprocable piston disposed in said cylinder, a pair of oppositely acting springs disposed in said cylinder and engaging opposite surfaces of said piston for normally centering the piston within the cylinder, said piston having an aperture varying in cross-sectional area from the smallest at the mid-portion of said aperture to the greatest at the ends of said aperture, a plug extending through the aperture and having a cross-sectional area varying from the greatest at the mid-portion of the plug to the smallest at the end portions thereof, and spring means normally locating the plug so that its mid-portion is adjacent the mid-portion of said aperture, said plug and said aperture defining an orifice through said piston which effects a pressure drop proportional to the first power of the rate of fluid flow through said orifice whereby the displacement of said piston from its centered position is proportional to the rate of fluid flow in said system and the direction of piston displacement is determined by the direction of fluid flow in said system.

2. A flow sensitive device for use in a fluid pressure system including a source of fluid pressure, a valve having a supply port connected with said source and a pair of control ports, and a pair of conduits connected to said control ports whereby said valve may be actuated to effect flow from said source through either of said conduits while the other conduit is connected to drain, comprising, a cylinder, a reciprocable piston disposed in said cylinder and dividing said cylinder into two chambers, each cylinder chamber being connected to one of said conduits, a pair of oppositely acting springs disposed in said chambers and engaging opposite surfaces of said piston for normally centering the piston within the cylinder, said piston having an aperture varying in cross-sectional area from the smallest at its mid-portion to the greatest at its ends, a plug extending through the aperture and having a cross-sectional area varying from the greatest at its mid-portion to the smallest at its end portions, and spring means carried by said piston and connected to said plug for normally locating the plug so that its mid-portion is adjacent the mid-portion of said aperture, said plug and said aperture defining an orifice connecting said cylinder chambers which effects a pressure drop proportional to the first power of the rate of fluid flow through said orifice whereby the displacement of said piston from its centered position is proportional to the rate of fluid flow in said system and the direction of piston displacement is determined by the direction of fluid flow in said piston.

References Cited in the file of this patent

UNITED STATES PATENTS

| 1,972,234 | Neumann | Sept. 4, 1934 |
| 2,358,611 | Ziebolz | Sept. 19, 1944 |
| 2,450,535 | Watson et al. | Oct. 5, 1948 |
| 2,494,781 | Stover | Jan. 17, 1950 |

FOREIGN PATENTS

| 546,145 | Great Britain | June 30, 1942 |